US006965074B2

(12) United States Patent
Lindberg et al.

(10) Patent No.: US 6,965,074 B2
(45) Date of Patent: Nov. 15, 2005

(54) POLE-TOP INSULATOR

(75) Inventors: Björn Lindberg, Ludvika (SE); Johan Engström, Västerås (SE)

(73) Assignee: ABB AB, Västerås (SE)

( * ) Notice: Subject to any disclaimer, the term of this patent is extended or adjusted under 35 U.S.C. 154(b) by 0 days.

(21) Appl. No.: 10/480,834

(22) PCT Filed: Jun. 3, 2002

(86) PCT No.: PCT/SE02/01054

§ 371 (c)(1),
(2), (4) Date: Jun. 10, 2004

(87) PCT Pub. No.: WO03/014496

PCT Pub. Date: Feb. 20, 2003

(65) Prior Publication Data
US 2004/0251385 A1 Dec. 16, 2004

(30) Foreign Application Priority Data
Jun. 14, 2001 (SE) .................................. 0102153

(51) Int. Cl.⁷ .............................................. H02G 7/20

(52) U.S. Cl. .................................... 174/43; 174/149 R

(58) Field of Search ............................... 174/40 R, 43, 174/44, 45 R, 148, 149 R, 158 R, 162, 163 R, 174/168, 169; 52/736.2; 248/49

(56) References Cited

U.S. PATENT DOCUMENTS

| 1,175,078 | A | * | 3/1916 | Peirce ..................... 174/149 R |
| 1,546,213 | A | * | 7/1925 | Duffy et al. .............. 174/45 R |
| 2,056,366 | A | * | 10/1936 | Richards et al. ........ 174/149 R |
| 3,032,606 | A | * | 5/1962 | Phillips ..................... 174/148 |
| 3,187,175 | A | * | 6/1965 | Lang ......................... 174/45 R |
| 3,267,202 | A | * | 8/1966 | Leonard ................... 174/45 R |
| 3,360,686 | A |   | 12/1967 | Kalb |
| 3,445,582 | A |   | 5/1969 | Herrenkohl |
| 3,637,918 | A | * | 1/1972 | Pasen ..................... 174/158 R |
| 3,649,740 | A |   | 3/1972 | Boyer et al. |
| 4,025,824 | A | * | 5/1977 | Cheatham ................. 174/45 R |
| 5,538,207 | A | * | 7/1996 | O'Connell et al. ........... 248/49 |
| 5,772,158 | A | * | 6/1998 | Blanding .................. 174/45 R |
| 5,981,879 | A | * | 11/1999 | Blanding .................... 174/168 |
| 6,229,086 | B1 |   | 5/2001 | Blanding |

* cited by examiner

Primary Examiner—Dean A. Reichard
Assistant Examiner—Adolfo Nino
(74) Attorney, Agent, or Firm—Venable LLP; Eric J. Franklin

(57) ABSTRACT

A pole-top insulator for carrying overhead electrical cables on pole legs or similar supporting structures located along power lines. One or more self-supporting tubular supporting arms made of electrically insulating composite material to which supporting cables are fixed are arranged on the top end of the supporting structures. The tubular supporting arms are joined to the supporting structure via an intermediate center part that can be attached to the supporting structure from which the tubular supporting arms extend outwards.

11 Claims, 3 Drawing Sheets

POLE-TOP INSULATOR

TECHNICAL FIELD

Figure 1:
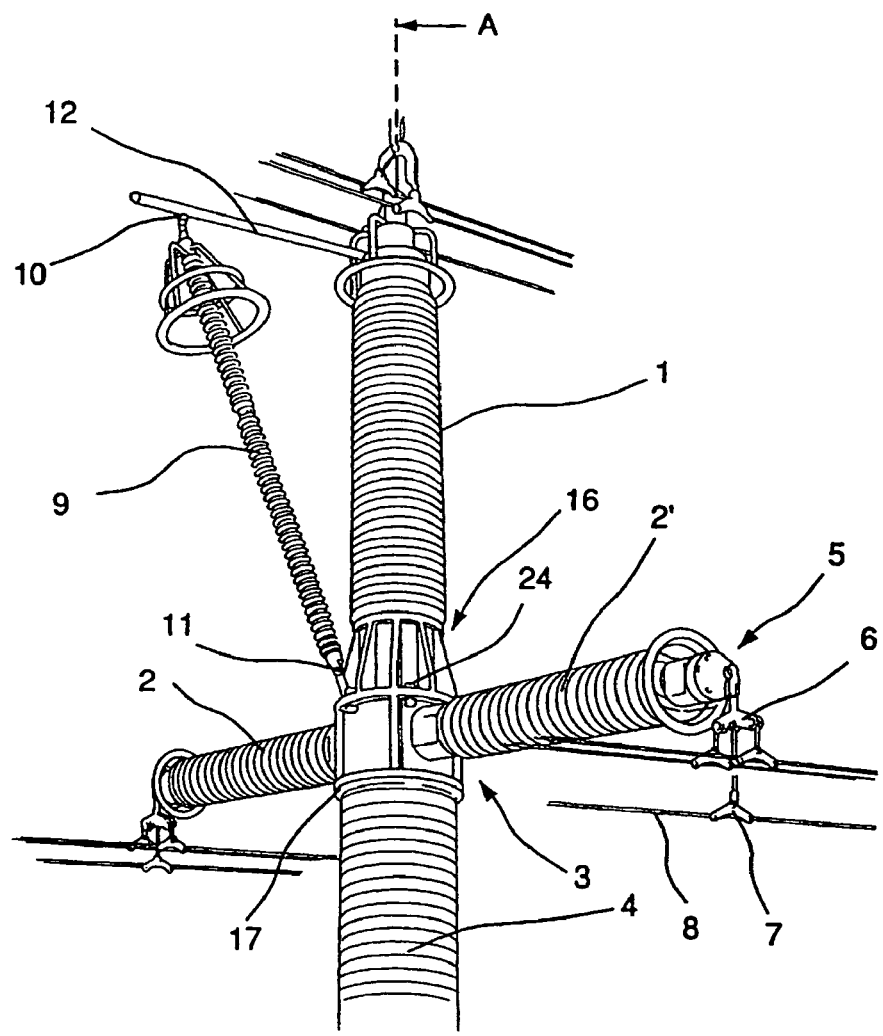

The present invention concerns a pole-top insulator for carrying overhead electrical cables on pole legs or similar supports located along power lines and that includes one or more self-supporting tubular parts made of electrically insulating composite material to which supporting cables are fixed on the top end of the said supports.

TECHNICAL STANDPOINT

The means of carrying cables in high-tension power lines is usually achieved with the use of pylons in the form of steel framework structures, the legs and upper horizontal crossbar of which form the structural components. The insulators are supported by the crossbar in an essentially freely suspended manner, whereby the lines or phase leads are attached to the bottom of the inuslators. The said insulators are only used for insulation and to separate the cables from each other and the pole structure, however.

One disadvantage with this known type of pole structure for power lines is that they require relatively long transverse bars to maintain the distance of the phase leads from each other and from the pole leg. As this support arrangement is built transversely, this makes power lines not only very large but also aesthetically distasteful. Furthermore, the said generally occurring support arrangement must be assembled or erected on site and in principle part by part, which is why the erection or assembly time for each individual pole structure with associated insulators becomes relatively long. Not least, this leads to the construction and completion of a finished power line being relatively expensive.

In order to achieve a compact insulating and self-supporting arrangement for supporting the phase leads, that is to say an arrangement that is both electrically insulating and at the same time also forms the supporting unit, it is already known that pole-top insulators can be made using different types of fibreglass designs or so-called composites. This known, self-supporting, insulating arrangement has thus far been used exclusively for low-voltage lines due to the problem of achieving the necessary strength to withstand the forces that arise in high-voltage power lines. In particular, it has proved to be difficult to overcome the strength problems that arise between the attachment points of the composite material or their transitional parts. Furthermore, it has been difficult to achieve sufficiently long and reliable leakage paths in the self-supporting insulating parts.

ACCOUNT OF THE INVENTION

The object of the present invention is therefore to produce an improved pole-top insulator and in this part a pole-top insulator that is not impaired with the aforesaid disadvantages. In particular, a pole-top insulator that is insulating and self-supporting, aesthetically attractive and possible to prefabricate to a high degree and in principle can be fitted to an existing pole leg as a complete unit is to be aimed at.

An additional object of the invention is to produce a pole-top insulator that considerably reduces the transverse span of the power line, i.e. its width, and which can be mounted on a pole leg or similar supporting structure as one prefabricated, compact, continuous unit.

Another object of the invention is to produce a power line carrier with a more compact design to form so-called compact lines, whereby the electromagnetic field surrounding the power line can be reduced and the aesthetic impression of the power line can be enhanced. It is further desirable to reduce the size of the carrier unit.

These objects can be achieved by the pole-top insulator according to the present invention It is conceivable, for example, that the invention could be modified so that both the centre part 3 and the tubular supporting arms are one continuous unit made of a composite material.

For reasons of manufacturing technique, the centre part 3 described in the embodiment below, from which the tubular supporting arms of composite material 1, 2, 2' extend, comprises in principle two separate parts. These are the centre part 3 itself and the support piece 16 joined to it. It should be understood, however, that the said parts could nevertheless be made in one piece or as one unit that would form the centre part 3.

FIGURE DESCRIPTION

Figure 2:
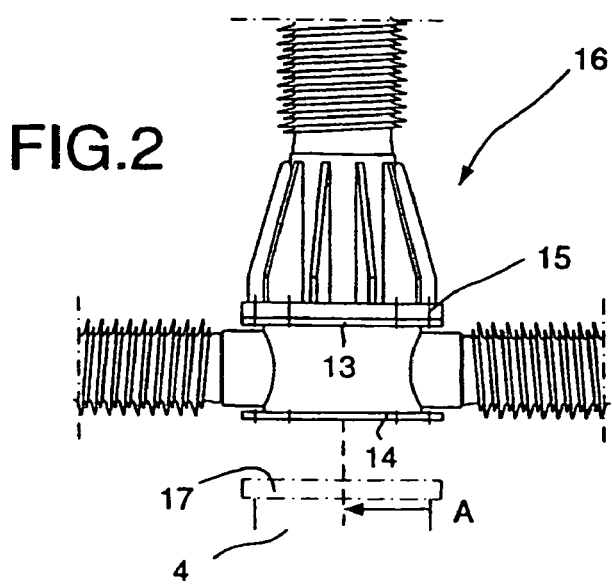
Figure 3:
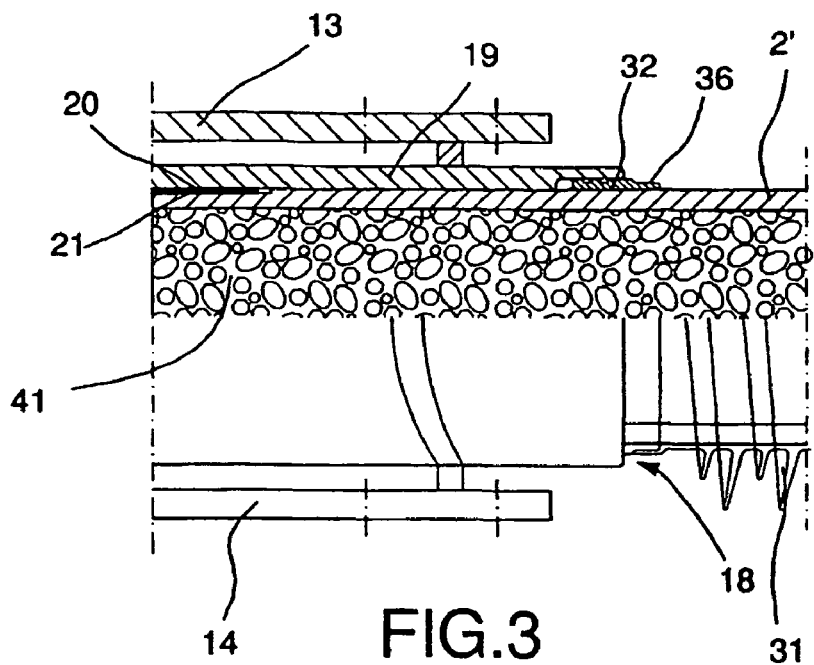

The following is a description of the invention with references to attached drawings, where FIG. 1 shows a perspective view of a pole-top insulator according to the invention mounted on the free end of a pole leg, FIG. 2 shows a side view of a centre part in the pole-top insulator, FIG. 3 shows a side view in partial cross-section of the mounting between a tubular part of a composite material in the pole-top insulator and the centre part.

Figure 4:
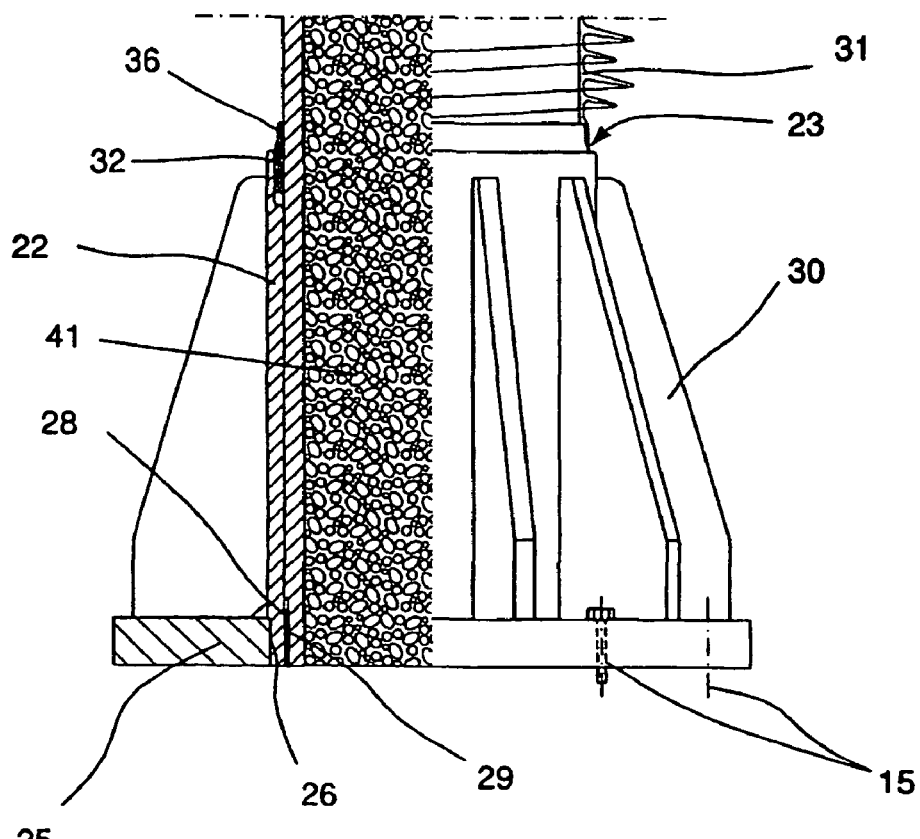
Figure 5:
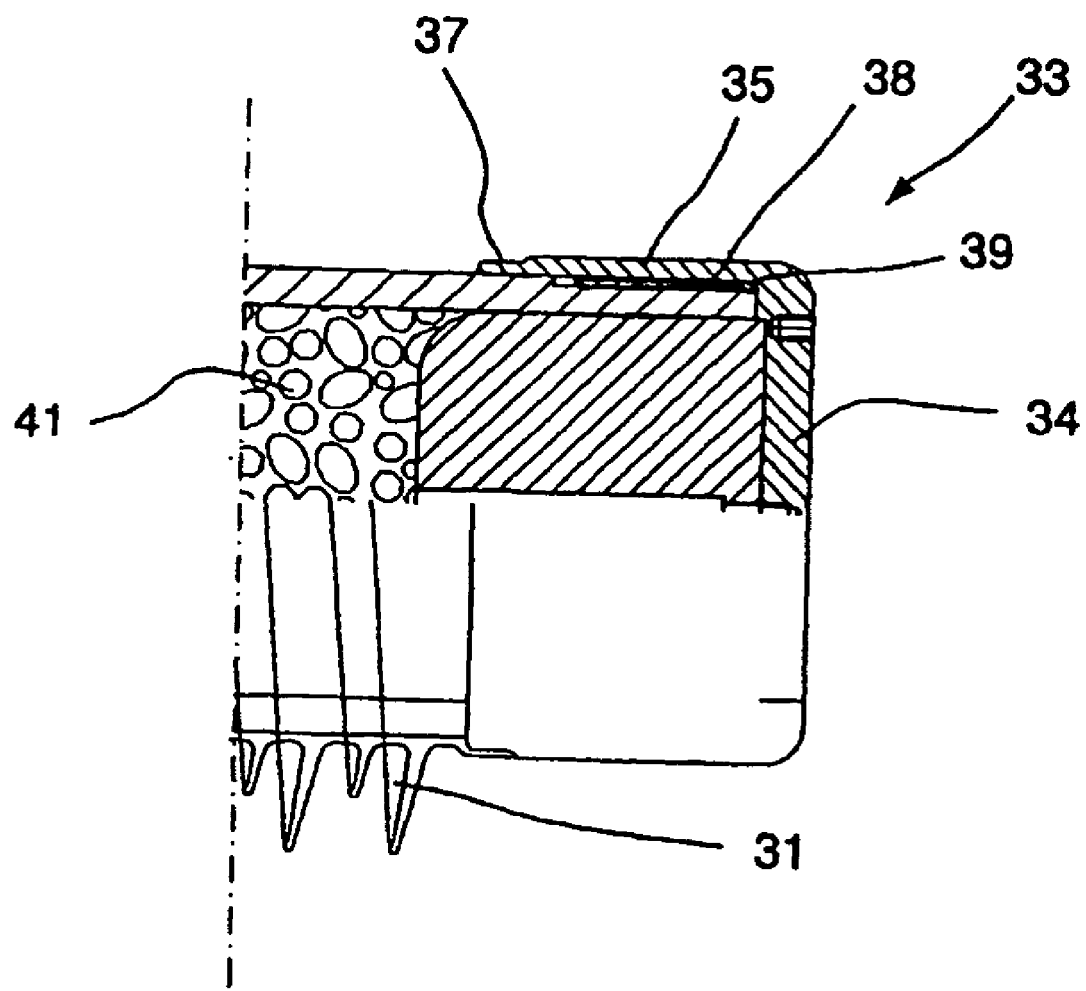

FIG. 4 shows a side view of a support part that is in the centre part and can be attached to it, and FIG. 5 shows a side view in partial cross-section of a flange located on the free end of the tubular part.

DESCRIPTION OF ONE EMBODIMENT

The present pole-top insulator in the embodiment shown in the drawings includes a first vertical tubular support arm 1 and a second and third designated 2 and 2' respectively similar tubular supporting arms that arm oriented horizontally and located symmetrically on each side of a vertical plane of symmetry A and through the vertical tubular part. Each tubular and relatively continuous supporting arm 1, 2 and 2' are made of some electrically insulating composite material, which can be made up of fiberglass reinforced epoxy. Suitable methods of manufacture include wet filament winding or injection moulding. Furthermore, the said tubular supporting arm can be monolithic or comprise several inter-joining tubular parts with a common centre axis. The tubular supporting arm then made is so designed that it exhibits both good insulating properties as well as such a high strength that it can be used as a self-supporting element with one or more phase leads or lines supported on its free end.

In order to exhibit good strength, the tubular supporting arm, besides being cylindrical, can have an essentially conical shape leading up to its free end Furthermore, the tubular supporting arm can include several different layers of long fibres running in alternate directions and can suitably be made of fibreglass or Kevlar fibre embedded in epoxy resin. As is known, the tubular supporting arms can suitably be made by winding fibreglass threads around a mandrel while applying epoxy resin. After curing the composite material, the finished tubular supporting arm can be removed.

As illustrated in FIG. 1 and FIG. 2, the tubular supporting arms 1, 2, 2' are inter-joined via a centre part 3 in such a way that the finished unit can be applied to the free end of a pole leg or similar support structure 4. The finished unit of supporting ar exhibits hereby an essentially triangular pattern viewed along the length of the lines or the supporting arms 1, 2, 2' in principle the shape of an upside down T, whereby the supporting arms can extend freely out from the centre part 3. Besides being space-saving, the said triangular form has been shown to reduce the magnetic radiation field by up to 50% compared to conventional supports where the leads are supported a distance from each other on horizontal crossbars. The tubular support arms 1 and 2, 2' are on their respective free ends fitted with retainers 5 comprising one or more C-shaped clips 7 arranged on arms 6 to which a phase line 8 is attached. It should be understood that the phase leads 8 arranged a distance from each other and supported by the pole-top insulator comprise the three respective phases of the conveyed alternating current and that each of the said tubular parts 1 and 2, 2' support one or more conductors for each such phase.

To protect the phase leads against being struck by lightning, a top lead (not shown) is mounted at the top of the vertical support arm 1. Overvoltage protection in the form of a valve-type surge arrester 9 is connected electrically between the top lead and the centre part 3 and therefore joined to the said parts at 10 and 11 respectively. As illustrated in FIG. 1, the top end 10 of the valve-type surge arrester 9 is connected to the top lead via an electrically conductive rod or arm 12 extending from the top free end of the supporting arm 1. Hereby, it is consequently simple to have the valve-type surge arrester 9 form one preassembled unit integrated with the pole-top insulator. In other words, the top lead is electrically connected to earth via the arm 12, valve-type surge arrester 9 and the centre part 3, whereby the connection to earth is made when the centre part 3 is applied to the support structure 4.

Referring to FIG. 2, the centre part 3 includes in principle a mainly cylindrical housing, the circular discoid sides 13 and 14 of which extend radially to form a flange-like mounting surface at their outer edges. The housing and the other parts described below are manufactured in an electrically conductive material, suitably aluminium. The housing is joined with a complementarily designed discoid flange to a support 16 arranged on the end of the vertical support arm 1 and to a discoid flange 17 on the upper end of the support structure 4.

The load bearing parts of an electric pylon are in some cases exerted to extremely high loads and bending stresses. The use of composite materials also involves certain problems regarding the present design of the pole-top insulator and in particular concerning the attachment points between the tubular supporting arms 1, 2, 2' and the centre part 3. In order to keep the radial compressive stress as low as possible, the joint between the said tubular parts 1, 2, 2' and the centre part 3 is designed in such a way that the supporting arms are supported along a considerable part of its outer edge when attached to the centre part The centre part 3 is described in more detail below and since its design is identical on each side of the plane of symmetry A, only one side will be described in detail with reference to FIG. 3. As is evident herewith, the centre part 3 has an opening 18 extending radially inwards perpendicular to the main axis of the vertical tubular supporting arm 1 defined by the inner space of a cylindrical support tube 19 extending diametrically through the centre part. One end of the horizontal supporting arm 2' is fitted into the said opening 18 and secured to the wall of the supporting tube 19 using a means of locking between the said parts, which herewith comprises interacting threads 20, 21. As should be understood, the outside thread 21 is made on the immediate end of the horizontal supporting arm 2'. A large supporting contact surface is achieved by the end of the horizontal supporting arm 2' extending far into the supporting tube 19.

FIG. 4 shows the vertical supporting arm 1 mounting in detail. In order to also give the vertical supporting arm 1 a long insert length and thereby large contact surface in its mounting with the centre part 3, the support 16 includes a cylindrical supporting tube 22, into the opening 23 of which a considerable part of one end of the vertical supporting arm 1 is inserted. The supporting tube 22 is joined perpendicularly to the main plain of a circular discoid flange 25, the outside diameter of which corresponds with the outside diameter of the side 13 of the centre part 3. The flange 25 has a hole arranged in its centre, against the wall 26 of which the bottom end of the supporting tube is fitted and fixed so that the supporting tube 22 and the discoid flange 25 exhibit concentric main axes. The discoid flange 25, and thereby the support 16, is joined to the top discoid side 13 of the centre part 3 by a means of union 15.

Similar to that described above, the vertical supporting arm 1 is fixed to the inside wall of the supporting tube 22 by a means of locking comprising interacting threads 28, 29. A long insert length in the supporting tube 22 contributes to a low contact pressure between the said parts. Similar to that described previously, the outside thread 29 is made on the immediate end of the vertical supporting arm 1.

For further reinforcement, there is a set of wedge-shaped bracing elements 30 evenly distributed around the outside edge of the supporting tube 22 and extending between the outside edge of the supporting tube and the main side of the discoid flange 25.

To avoid current leakage, the tubular supporting arms 1, 2, 2' have an outer insulation of wave or groove profile silicone 31 on their outer edges extending along each supporting arm between a ring 32 of conductive material located on the end of the supporting arm that is fitted into the centre part 3 and the support 16 respectively, and a circular flange 33 arranged on the other free end of the supporting arm. As illustrated in FIG. 5, the said flange 33 is so designed that it surrounds and essentially seals the free end of each supporting arm 1, 2, 2'. Therefore, the flange 33 includes a bottom part 34 facing the end of the supporting arm and a ring-shaped side wall 35 extending radially from the bottom part to surround a length of the outside edge of the supporting arm. Both the ring 32 and the flange 33 exhibit a length of reduced diameter 36 and 37 respectively, which forms the defined connection and contact points for the silicone layer 31 and allows a smooth and pliant transition between the said parts. In an essentially similar way as described above, the flange 33 is fixed to the said supporting arms 1 and 2, 2' respectively via a means of locking comprising interacting threads 38, 39. The bottom part 34 is furthermore fitted with a means of fastening in the form of threaded holes 40 that make it possible to easily screw on the retainers 5 to the free ends of the supporting arms for attaching the leads.

To prevent damp entering and thereby causing current leakage in the interior cavities of the tubular supporting arms 1, 2, 2' they are filled with a foam material 41.

The present invention is not limited to the above description or as illustrated in the drawings but can be changed and modified in a number of different ways within the framework of the idea of invention specified in the following claims.

What is claimed is:

1. A pole-top insulator for carrying overhead electrical lines on a supporting structure, the pole-top insulator comprising:
   at least one self-supporting tubular supporting arm made of electrically insulating composite material, the at least self-supporting arm being attached to the upper end of the supporting structure; and
   a common intermediate center part operative to join the at least one self-supporting arm to the supporting structure, the center part comprising support tubes each including an opening, each opening being operative to receive an end of one of the at least one self-supporting arms, such that the at least one self-supporting arm is supported along a considerable part of its outer edge when attached to the center part, and wherein the at least one self-supporting arm extends outwards from the center part.

2. The pole-top insulator according to claim 1, wherein the at least one self-supporting arm is designed as an essentially continuous element comprising a first end inserted into the insert openings and a second free end.

3. The pole-top insulator according to claim 2, further comprising:
   a retainer arranged on the free end of the at least one self-supporting the retainer being operative to support the lines.

4. The pole-top insulator according to claim 1, wherein the center part is designed in one unit separate from the at least one self-supporting arm.

5. The pole-top insulator according to claim 1, wherein the center part is made of a conductive material.

6. The pole-top insulator according to claim 1, wherein the pole-top insulator comprises a plurality of self-supporting arms extending from the center part at different relative angles.

7. The pole-top insulator according to claim 1, wherein one of the at least one self-supporting arm extends vertically up from the center part.

8. The pole-top insulator according to claim 1, wherein the insulator comprises a plurality of self-supporting arms, wherein two of the self-supporting arms extend horizontally from the center part.

9. The pole-top insulator according to claim 1, wherein the insulator comprises a plurality of self-supporting arms, wherein the self-supporting arms are angled such that phase leads attached to the self-supporting arms are kept braced at a distance from each other in a triangular shape viewed along a direction of the phase leads.

10. The pole-top insulator according to claim 1, wherein the pole-top insulator comprises three self-supporting arms arranged in a shape of an inverted T.

11. The pole-top insulator according to claim 1, wherein the at least one self-supporting arm and the center part are designed as one integrated prefabricated unit.

\* \* \* \* \*